(No Model.)

S. R. EVANS.
GATE AND RAILING.

No. 267,170. Patented Nov. 7, 1882.

Witnesses:
E. C. Dicey
E. Hollenshade

Inventor:
Seth R Evans

UNITED STATES PATENT OFFICE.

SETH R. EVANS, OF CHICAGO, ILLINOIS.

GATE AND RAILING.

SPECIFICATION forming part of Letters Patent No. 267,170, dated November 7, 1882.

Application filed May 8, 1882. (No model.)

*To all whom it may concern:*

Be it known that I, S. R. EVANS, of the city of Chicago, in the county of Cook and State of Illinois, have invented a new and useful Improvement in Gates and Railings, of which the following is such a full, clear, and true description as will enable others skilled in the art to make and use the same, reference being had to the accompanying drawings and letters of reference marked thereon, which are a part of this specification.

My invention has for its object the combination of strength and rigidity with lightness and economy in construction, and making the frame and attachments in effect one integral whole, without the necessity of welding, riveting, or screwing the parts in place.

Figure 1:
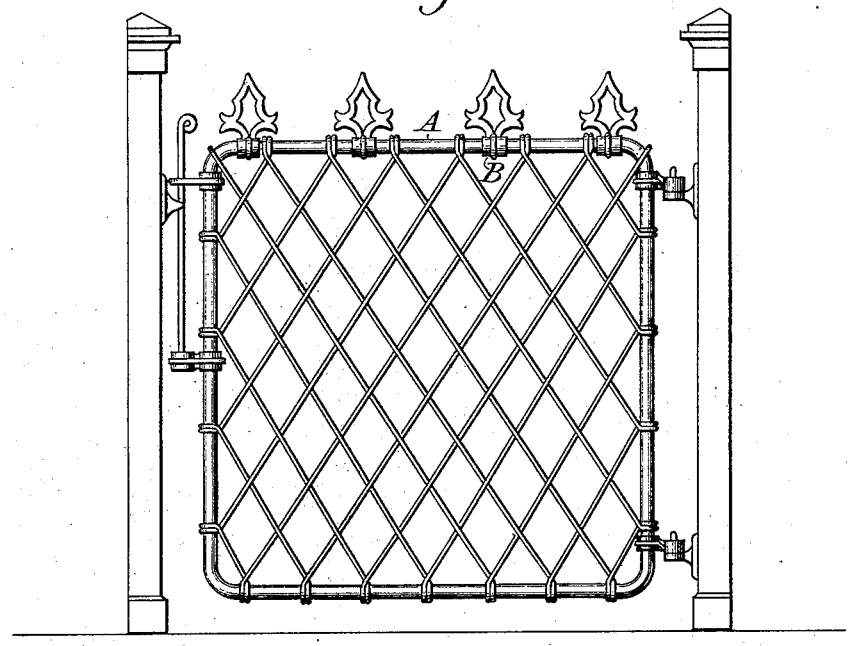
Figure 2:
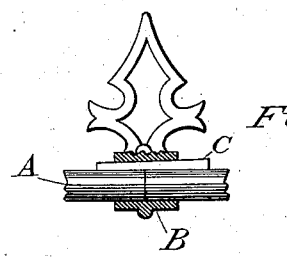
Figure 3:
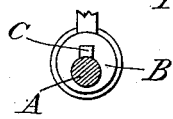

Figure 1 is an elevation of my improved gate. Fig. 2 is an enlarged picket, partly in section, showing ends of frame keyed together in the center of hub. Fig. 3 is an end view of hub.

Like letters indicate like parts in the drawings.

To construct my device I take a rod or pipe of sufficient length to make the frame, then square the ends, so that they may be brought fairly together, and having slipped on the hinges and brackets or ornaments, which are made to fit as closely as consistent with being easily put in place, and the hubs having been made eccentric to the rod, with key-seat in the enlarged side, the rod or pipe is bent around a templet to give it the required form, bringing the opposite ends together inside of one of the hubs and keyed fast, as shown at Fig. 2. The other attachments are next placed in position and keyed fast. The frame is now ready for the center or web to be woven in, as shown at Fig. 1.

I am aware that a shaft-coupling having half-length keys or wedges inserted in each end, the keys being held in place by a bolt, for convenience of coupling shafts of different diameters, is in use, as shown by Patent No. 174,177; also, that a sleeve or coupling has been used for iron fences, and fastened in place by a key passing diametrically through the coupling, the rails first being scarfed to prevent their pulling apart, as shown by Patent No. 92,579. I therefore claim no part or lot in either of the above inventions; but

What I claim, and desire to secure by Letters Patent, is—

The frame A of a gate or railing, joined together by means of the eccentric hub or sleeve B and the longitudinal full-length key C, specifically as shown.

SETH R. EVANS.

Witnesses:
E. HOLENSHADE,
E. C. DICEY.